(12) United States Patent
Malcolm et al.

(10) Patent No.: US 8,996,145 B2
(45) Date of Patent: Mar. 31, 2015

(54) ALBUM PLAYBACK IN A RANDOM MODE

(75) Inventors: David Malcolm, Somerville, MA (US); Judith L. Uffer, Sommerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1432 days.

(21) Appl. No.: 12/040,003

(22) Filed: Feb. 29, 2008

(65) Prior Publication Data
US 2009/0222115 A1 Sep. 3, 2009

(51) Int. Cl.
*G06F 17/00* (2006.01)
*G06F 17/30* (2006.01)
*G11B 27/10* (2006.01)
*G11B 27/11* (2006.01)

(52) U.S. Cl.
CPC .... *G06F 17/30772* (2013.01); *G06F 17/30749* (2013.01); *G11B 27/105* (2013.01); *G11B 27/11* (2013.01)
USPC .......................................................... 700/94

(58) Field of Classification Search
CPC ....... G06F 3/16; G06F 3/167; G06F 17/3074; G06F 17/30769; G06F 17/30772; G06F 17/30743; G06F 17/30749
USPC ................... 700/94; 369/1–12; 704/500–504
See application file for complete search history.

(56) References Cited

U.S. PATENT DOCUMENTS

| | | | |
|---|---|---|---|
| 6,721,489 B1 * | 4/2004 | Benyamin et al. | 386/243 |
| 7,689,304 B2 * | 3/2010 | Sasaki | 700/94 |
| 2003/0086699 A1 * | 5/2003 | Benyamin et al. | 386/96 |
| 2006/0101175 A1 * | 5/2006 | Du et al. | 710/62 |

* cited by examiner

*Primary Examiner* — Andrew C Flanders
(74) *Attorney, Agent, or Firm* — Lowenstein Sandler LLP

(57) ABSTRACT

An embodiment relates generally to a method of playback in a media player. The method includes retrieving at least one song from a media library in a random mode on a media player and playing the at least one song through the media player. The method also includes initiating an album mode on the media player and retrieving remaining songs on an album associated with the at least one song.

16 Claims, 4 Drawing Sheets

ALBUM PLAYBACK IN A RANDOM MODE

FIELD

This invention relates generally to media players, more particularly, to systems and methods for album playback in a random mode on a media player.

DESCRIPTION OF THE RELATED ART

Media players have become commonplace in today's modern world. Media players are typically a portable electronic device capable of storing media files (digital image, digital audio files, and/or digital video files). The media player can playback the media files in a variety of methods. A user can set up playlists to play selected songs, a sequential mode of playing songs in a particular order or a random (or shuffle) mode where the media player picks the songs from a library or playlist for playback randomly according to a random algorithm. The media players often connect to a computer where media player software manages the portable media player.

The media player software executing on the computer provides a mechanism for a user to transfer audio or video disks to a compatible format for the portable media player. For example, a user with a large audio collection can use the computer to import an audio compact disk into a library of the media player software. The media player software can also interact with media websites to download media files.

When a user connects the portable media player to the computer, the media player software typically synchronizes the library with the portable media player. More particularly, new media files that were added or deleted from the library, newly created playlists or modified playlists since the last synchronization event are updated to the portable media player. After synchronization, the media files and any playlists are the same in the media player software and the portable media player.

The media websites currently offer two types of services. A user can purchase music by the song or album, where the purchase of the media file often allows unlimited playback of the purchased song with limited burn capability to media such as a compact disk or digital video (or versatile) disk. The user can also subscribe to a media site where the user can download unlimited number of media files but the media files can only be played back while the user is a current member. If the users lets her subscription lapse, the downloaded media files become inoperable via digital rights management technologies.

A typical user of a media player usually continues to download or import media files into the library. As the library continues to grow as well as media player storage space, a user may often forget what is exactly in his library. For instance, a user may hear an audio file (a song) while in random mode from an artist and recall additional songs from the album that he liked. Currently, a user would manually search the library or the portable media player for the rest of the album, and initiate a sequential mode of playback when the rest of the album is located. This process can be time-consuming as well as burdensome.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of media players and/or software applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for album mode playback while in a shuffle mode for media players (devices and associated software). More particularly, a user can set a random or shuffle mode for the media player, where the music player can be a portable device or a software application executing on a computing platform. The user can detect a song and enable the album mode on the media player. The media player can be configured to retrieve the rest of the songs of the album associated with the selected song from a media library and queue the rest of the songs of the album for playback in the shuffle mode. If the user is a member of a media subscription service, the album mode can retrieve the rest of the album from the media subscription service instead of the local library of the user.

Figure 1:
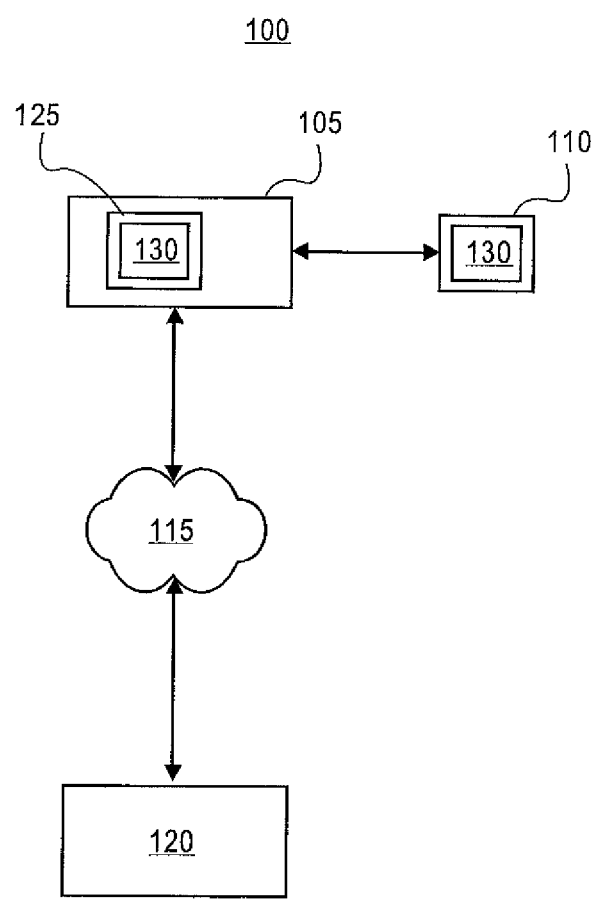
FIG. 1 depicts an exemplary system in accordance with various embodiments.

FIG. 1 illustrates an exemplary system 100 in accordance with various embodiments. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise a computer device 105, a portable media player 110, a network 115 and a media site 120. The computer device 105 can be a desktop computer, laptop, client, or other similar computing platform as known to those skilled in the art. The computer device 105 can further comprise of a processor, non-persistent storage (e.g., dynamic random access memory), persistent storage (e.g., a disk drive), input/output devices (e.g., mouse, keyboard), a display, peripherals (such as read/write DVD/CD drives, and a network interface (wired or wireless).

The computer device 105 can execute an open source (such as Linux™) or proprietary (Windows™ or Mac™) operating systems which is stored in the persistent storage and then loaded into the non-persistent storage. The computer device 105 can also store and execute a media player application 125 among other applications.

The media player application 125 can be configured to provide management and playback of media files. More particularly, the media player application 125 can convert original CD or DVD into digital media files that can be played back by the media player application 125. The media player application 125 can also store the media files in the persistent storage of the computer device 105 and manage the playback of the media files. For example, the media player application 125 can allow the user to create playlists. The playlists can be media files selected by a user based on a user-determined criteria.

The media player application 125 can further be configured to manage the portable media player 110. More specifically, the media player application 125 can be configured to synchronize the media library with the media files as well as playlists stored within the portable media player 110. For example, if the user has added new media files or deleted media files, the media player application 125 can be configured to add the new media files to the portable media player 110 or remove the deleted media files from the portable media player 110. In some embodiments, this synchronization event occurs whenever the portable media player 110 is connected to the computer device 105.

The media player application 125 can be further configured to playback media files in several modes. One mode can be a sequential mode where media files in the media library or a playlist are played back in sequential order based on alpha-numeric, time-dated or other user provided criteria. Another mode can be a random or shuffle mode. The random mode can play back media file within the media library or a playlist in a random order.

The portable media player 110 can be configured to provide a mobile platform for the user to enjoy the media files. While detached from the computer device 105, the portable media player 110 can be configured with the similar functionality as the media player application 125, i.e, manage and playback the stored media files. The portable media player 110 can be implemented as a hand-held device with an input interface to operate the portable media player 110, a display device, an audio interface, a computer interface (e.g., USB), and a persistent storage for storing media files. The portable media player 110 can also be equipped with a wireless network connection to connect with the Internet and can reach media site 120 itself.

The computer device 105 can be coupled to the network 115. The network 115 can be a local area network, a wide area network or combinations thereof implementing network protocols such as TCP/IP, ATM, SONET, or other known network protocols The network 115 can also be part of a network service that provides Internet access for users. The network 110 can be configured to provide a communication conduit for data, services, and applications to be exchanged between the computer device 105 and the media website 120.

The media website 120 can be a location where a user of the computer device 105 can purchase and download media files. The media website 120 can be configured to provide media files on an individual file basis, an album basis, a subscription basis or combinations thereof. Examples of these types of media websites 120 can be iTunes™ or eMusic™ sites.

In some embodiments, the media player application 125 and the portable media player 110 can execute an album mode 130. More particularly, a user can set a random or shuffle mode for the media player (portable media player 110 or media player application 125). The user can detect a media file and enable the album mode 130 on the media player (110 or 125). The media player (110 or 125) can be configured to retrieve the rest of the songs of the album associated with the selected song from a media library and queue the rest of the songs of the album for playback in the shuffle mode. If the user is a member of a media subscription service such as media site 120, the album mode 130 can retrieve the rest of the album from the media subscription service instead of the user's local library.

Figure 2:
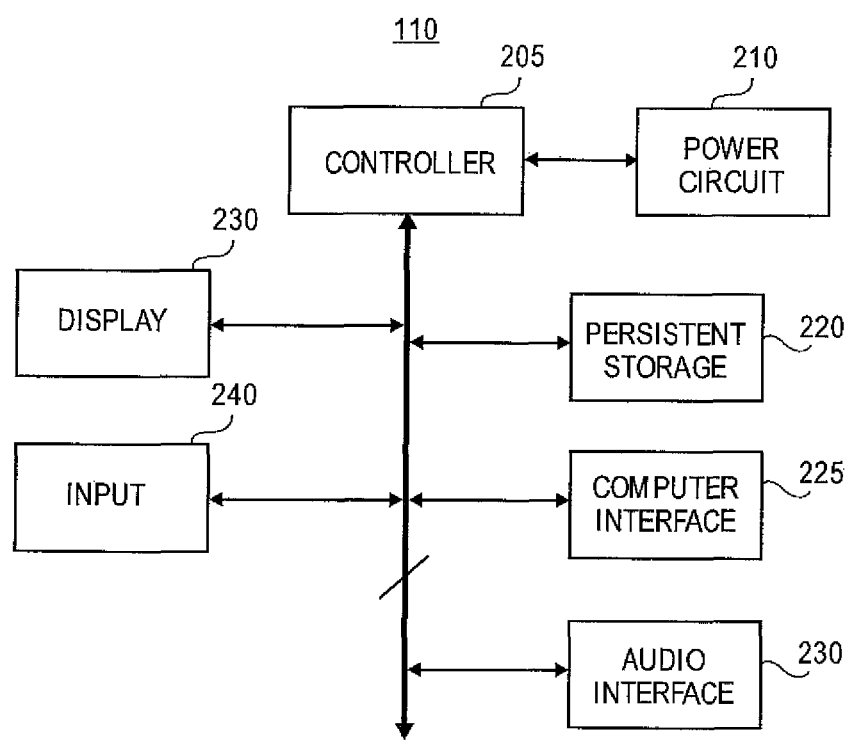
FIG. 2 illustrates an exemplary block diagram of a portable media player in accordance with various embodiments.

FIG. 2 shows an exemplary block diagram of a portable media player 110 in accordance with various embodiments. It should be readily apparent to those of ordinary skill in the art that the portable media player 110 depicted in FIG. 2 represents a generalized schematic illustration and that other components may be added or existing components may be removed or modified.

As shown in FIG. 2, the portable media player 110 can comprise of a controller 205, a power circuit 210 a bus 215, a persistent storage 220, a computer interface 225, an audio interface 230, a display 235 and an input module 240. The controller 205 can be configured to provide a computing platform for the functionality of the portable media player 110 as previously described and described in greater detail below. The controller 205 can be implemented with a microprocessors, a digital signal processor, a microcontroller circuit, an application specific integrated circuit, EEPROM, PROM, or other similar device. In some embodiments, the controller 205 can be equipped with a read only memory (not shown) for storage of the embedded operating system and the media player application. The controller 205 can also be equipped with random access memory for application space for the media player application as well as the album mode module 130.

The controller 205 can be coupled to the power circuit 210, which is configured to provide power for the portable media player 110. The power circuit 210 can comprise of a rechargeable battery (not shown) such as lithium-ion type. Power for recharging the power circuit 210 can originate from the computer interface 225 over the bus 215 when connected to the computer device 105 or to a charger device as known to those skilled in the art.

The controller 205 can be further coupled to the bus 215. The bus 215 can be configured to provide a communication channel to exchange data, commands, and/or power for the components of the portable media player 110. The bus 215 can be implemented with a bus protocol such as Universal Serial Bus (USB), IEEE1394 or other similar bus protocol that allows for high-bandwidth and transfer of power.

The controller 205 can be coupled via bus 215 to the computer interface 225. The computer interface 225 can be a connector that provides an interface for the computer device 105 as well as a wall charger for the portable media player 110. Synchronization updates from the media player application 125 executing on the computer device 105 arrive through this interface 225 when connected to the computer device 105.

The controller 205 can also be coupled to the audio interface 230 via the bus 215. The audio interface 230 can be configured to provide a connector interface for audio output from the portable media player 110. The audio interface 230 can include a digital analog converter (not shown) for conversion of the digital signal from the media file to analog signals to be heard by a user. The audio interface 230 can be configured to receive headphone jacks as well as cable connectors for stereo input.

The controller 205 can be further coupled to the display 235 via the bus 215. The display 235 can be configured to provide a visual interface for a user to interact with the portable media player 110. The display 235 can provide an operating menu for operation and management of the portable media player 110. The menu can be manipulated using the input module 240. The input module 240 can provide a tactile interface where a user can scroll through the operating menu and to initiate actions such as a random mode or a sequential mode among other operations known to those skilled in the art. In some embodiments, the input module can be integrated with display 235, i.e., touch screen technology.

Figure 3:
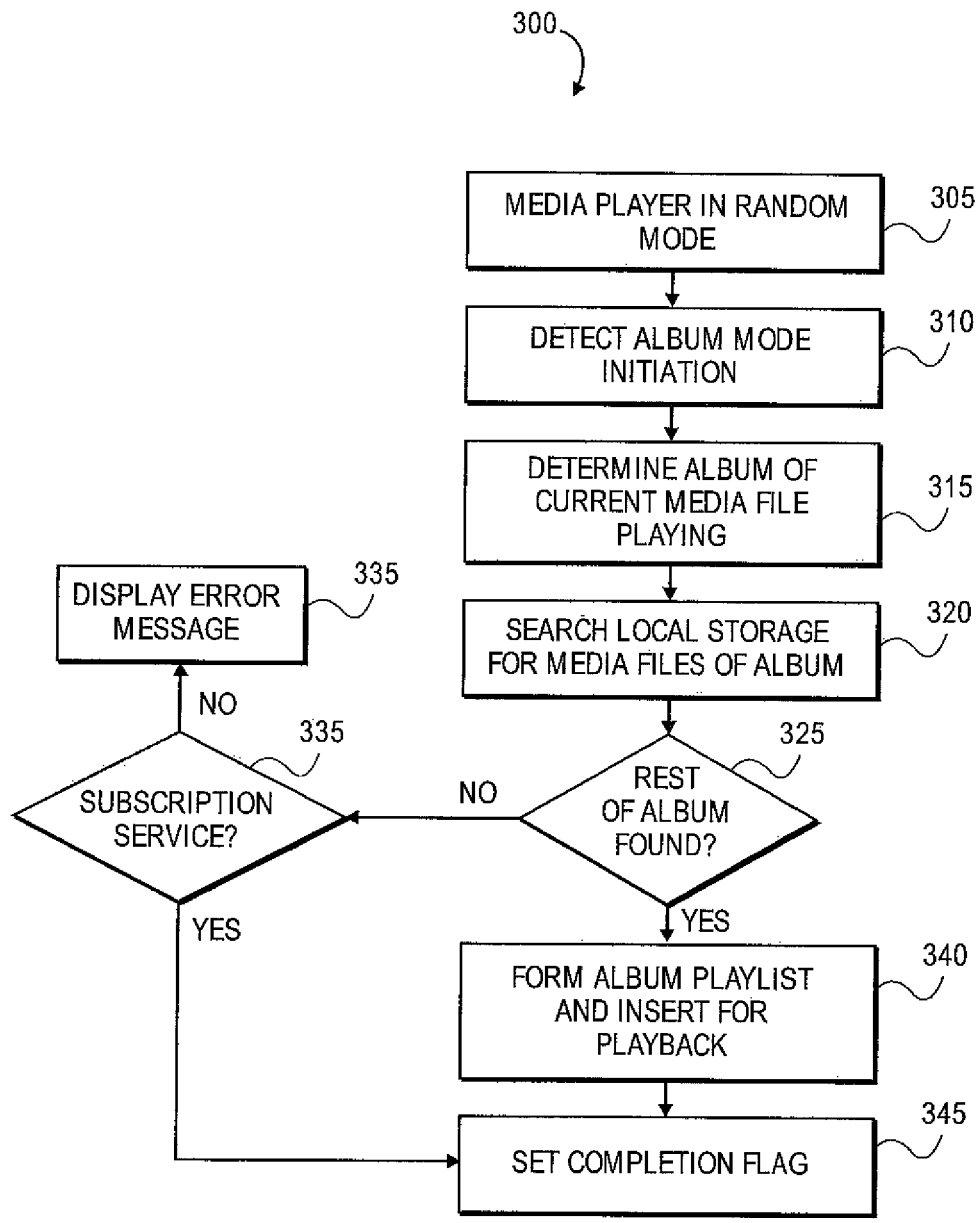
FIG. 3 depicts an exemplary flow diagram in accordance with various embodiments.

FIG. 3 illustrates an exemplary flow diagram 300 for the album mode module 130 executed by the controller 205 and in media player application 125. It should be readily apparent to those of ordinary skill in the art that the flow diagram 300 depicted in FIG. 3 represents a generalized schematic illustration and that other steps may be added or existing steps may be removed or modified.

As shown in FIG. 3, the media player (110, 125) can be configured in a random mode, in step 305. More particularly, a user can initiate the random mode by selecting the media library or a playlist through the operating menu. The media player (110, 125) can then play the selected media files in a random order.

In step 310, a user may have selected a media file for album mode, i.e., the user would like to hear the rest of the associated album of the selected media file. More specifically, the user can select this album mode by scrolling through the operating menu and initiating the album mode via the input 240. In some embodiments, the portable media device can have a specific input widget, for example, a button, to initiate the album mode.

In step 315, the media player (110, 125) can be configured to determine the album of the media file currently being played. The media player (110, 125) can examine the metadata associated with the selected media file to determine the associated album. As known to those skilled in the art, the metadata of the media file can comprise of information such as title, length of time, track number, year of release, album title, category of music, etc.

In step 320, the media player (110, 125) can be configured to search the local storage for the rest of the media files associated with the album during the playback of the media file in the background. More particularly, in the portable media player 110, the controller 205 can be configured to search the persistent storage 220 for the desired media files. In the media player application 125, the media player application 125 can search the persistent storage of the computer device 105.

In step 325, the search results can be returned and a determination of whether or not the rest of the album was located. If the search resulted in not finding the rest of the album, the media player (110, 125) can determine whether the user is a member of a media subscription service, in step 330. If the user is not a member of the media subscription service, the media player (110, 125) can display an error message that the album was not located on the display 235. Otherwise, if the user is a belongs to the media subscription service, the media player (110, 125) can retrieve the rest of media files of the album for playback. In some embodiments, pointers to the selected media files are retrieved. Subsequently, the media player (110, 125) proceeds with the processing of step 340.

Returning to step 325, if the rest of the media files associated with the album are located, the media player (110, 125) can retrieve the rest of the media files, i.e., pointers to the selected media files, for playback, in step 340. More specifically, a playlist for the selected media files is created and inserted for playback after the completion of playing of the original media file.

In step 345, the media player (110, 125) can be configured to set a completion flag on the last media file on the album playlist, where the media player (110, 125) can return to the random mode after the last media file is played back.

In step 350, the media player (110, 125) can be configured to generate a graphical widget on the display 235 that indicates that the rest of the album is ready for playback. The user can then activate the widget to play the rest of the album.

Figure 4:
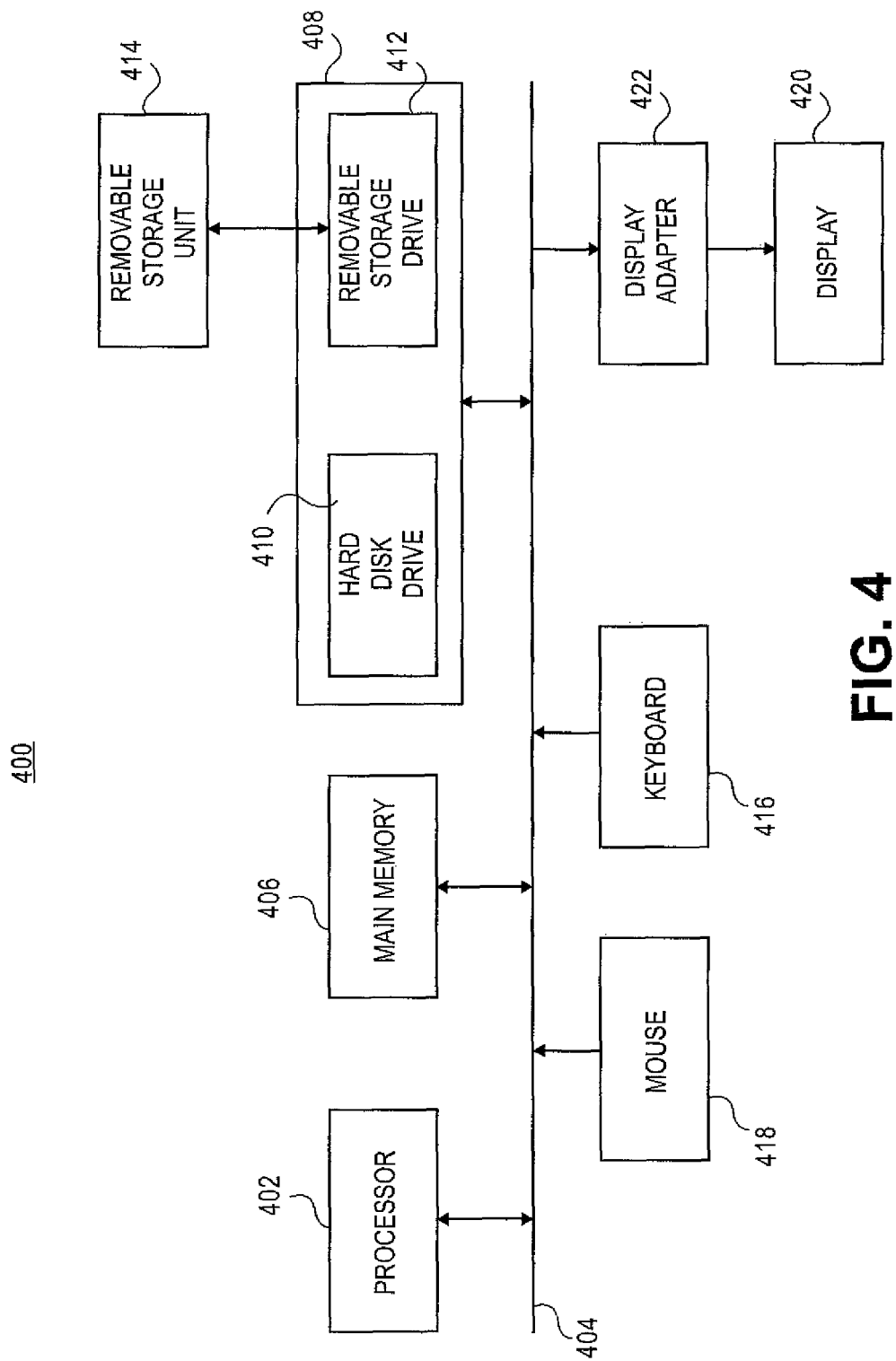
FIG. 4 illustrates an exemplary computing platform in accordance with various embodiment.

FIG. 4 illustrates an exemplary block diagram of a computer device 105 where an embodiment may be practiced. The functions of the media player application 125 may be implemented in program code and executed by the computer device 105. The media player application 125 may be implemented in computer languages such as PASCAL, C, C++, JAVA, etc.

As shown in FIG. 4, the computer device 105 includes one or more processors, such as processor 402 that provide an execution platform for embodiments of the media player application 125. Commands and data from the processor 402 are communicated over a communication bus 404. The computer device 105 also includes a main memory 406, such as a Random Access Memory (RAM), where the media player application 125 may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the media player application 125 may be stored. The removable storage drive 412 reads from and/or writes to a removable storage unit 414 in a well-known manner. A user interfaces with the media player application 125 with a keyboard 416, a mouse 418, and a display 420. The display adapter 422 interfaces with the communication bus 404 and the display 420. The display adapter 422 also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    receiving a selection of a first set of media files for play in a random mode;
    retrieving an audio file of the first set of media files from a media library on a media player, the audio file associated with an album;
    commencing play of the audio file through the media player;
    initiating an album mode on the media player;
    retrieving an additional audio file associated with the album with which the audio file is associated;
    adding the additional audio file to the first set of media files;
    commencing, by a processor, play of the additional audio file after a completion of play of the audio file; and
    automatically returning the media player to the random mode for play of the first set of media files after a completion of play of the additional audio file.

2. The method of claim 1, wherein a plurality of additional audio files are retrieved and ordered for playback after completion of play of the audio file.

3. The method of claim 1, wherein the media library is located on a local drive of the media player.

4. The method of claim 1, wherein the media library is located on a music subscription service.

5. The method of claim 1, further comprising displaying an error message in response to a failure of retrieving the additional audio file associated with the audio file.

6. The method of claim 1, wherein retrieving the additional audio file associated with the album further comprises attempting to retrieve the additional audio file associated with the album in the background while the audio file is playing.

7. The method of claim 6, further comprising generating a widget to indicate the additional audio file on the album are retrieved and ready to play in response to the retrieval of the additional audio file.

8. A non-transitory computer-readable storage medium including instructions that, when executed by a processor, cause the processor to:
    receive a selection of a first set of media files for play in a random mode,
    retrieve an audio file of the first set of media files from a media library on a media player, the audio file associated with an album,
    receive an indication to initiate an album mode in response to a signal from the input interface while playing the audio file, the audio file associated with an album,
    compile an album playlist that comprises an additional media file associated with the album with which the selected media file is associated,
    add, by the processor, the album playlist to the first set of media files,
    order the album playlist for playback of the additional media file after a completion of playback of the audio file, and
    automatically return the media player to the random mode for play of the first set of media files after a completion of play of the additional media file.

9. The non-transitory computer readable medium of claim 8, the processor to display an error message on the display unit in response to a failure to retrieve any of the additional media file associated with the album.

10. The non-transitory computer readable medium of claim 8, the processor to search for the additional media file associated with the album at a music subscription service in response to a failure of retrieving the additional media file associated with the album on the persistent storage module and the computer interface coupled to the computer device.

11. A system comprising:
    a memory comprising instructions; and
    a processor operatively coupled to the memory, the processor to execute the instructions to:
    receive a selection of a first set of media files for play in a random mode,
    retrieve an audio file of the first set of media files from a media library on a media player, the audio file associated with an album,
    receive an indication to initiate an album mode in response to a signal from the input interface while playing the audio file, the audio file associated with an album,
    compile an album playlist that further comprises an additional media file associated with the album with which the selected media file is associated,
    add the album playlist to the first set of media files,
    order the album playlist for playback of the additional media file after a completion of playback of the audio file,
    commence play of the additional media file, and
    automatically return the media player to the random mode for play of the first set of media files after a completion of play of the additional media file.

12. The system of claim 11, the processor to display an error message on the display unit in response to a failure of retrieving the additional media file associated with the album.

13. The system of claim 12, wherein the additional media file further comprises an audio file.

14. The system of claim 11, the processor to search for the additional media file associated with the album at a music subscription service in response to a failure of retrieving the additional media file associated with the album on the memory.

15. The system of claim 11, the processor to retrieve the additional media file associated with the album in the background during the playback of the audio file.

16. The system of claim 15, the processor to generate a widget to indicate that the additional media file associated with the album is retrieved and ready to play in response to the retrieval of the additional media file associated with the album.

* * * * *